(12) United States Patent
Blankespoor et al.

(10) Patent No.: US 12,172,719 B2
(45) Date of Patent: Dec. 24, 2024

(54) WHOLE BODY MANIPULATION ON A LEGGED ROBOT USING DYNAMIC BALANCE

(71) Applicant: Boston Dynamics, Inc., Waltham, MA (US)

(72) Inventors: Kevin Blankespoor, Arlington, MA (US); Benjamin Stephens, Somerville, MA (US); Nicolas Hudson, San Mateo, CA (US); Yeuhi Abe, Cambridge, MA (US); Jennifer Barry, Cambridge, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

(21) Appl. No.: 18/307,467

(22) Filed: Apr. 26, 2023

(65) Prior Publication Data

US 2023/0303193 A1    Sep. 28, 2023

Related U.S. Application Data

(63) Continuation of application No. 16/433,779, filed on Jun. 6, 2019, now Pat. No. 11,667,343, which is a
(Continued)

(51) Int. Cl.
*B62D 57/00* (2006.01)
*B25J 9/16* (2006.01)
(Continued)

(52) U.S. Cl.
CPC .......... *B62D 57/032* (2013.01); *B25J 9/162* (2013.01); *B25J 9/1633* (2013.01); *B25J 9/1694* (2013.01);
(Continued)

(58) Field of Classification Search
USPC ................................................ 700/245–264
See application file for complete search history.

(56) References Cited

U.S. PATENT DOCUMENTS

| 5,550,953 A | 8/1996 | Seraji | |
|---|---|---|---|
| 6,505,096 B2 * | 1/2003 | Takenaka | B62D 57/02 318/568.12 |

(Continued)

FOREIGN PATENT DOCUMENTS

| CN | 110035872 A | 7/2019 |
|---|---|---|
| CN | 114800509 A | 7/2022 |

(Continued)

OTHER PUBLICATIONS

International Preliminary Report on patentability in Application No. PCT/US2017/064939, Jun. 18, 2019, 10 pages.
(Continued)

*Primary Examiner* — Jonathan L Sample
(74) *Attorney, Agent, or Firm* — Knobbe, Martens, Olson & Bear, LLP

(57) ABSTRACT

A robot system includes: an upper body section including one or more end-effectors; a lower body section including one or more legs; and an intermediate body section coupling the upper and lower body sections. An upper body control system operates at least one of the end-effectors. The intermediate body section experiences a first intermediate body linear force and/or moment based on an end-effector force acting on the at least one end-effector. A lower body control system operates the one or more legs. The one or more legs experience respective surface reaction forces. The intermediate body section experiences a second intermediate body linear force and/or moment based on the surface reaction forces. The lower body control system operates the one or more legs so that the second intermediate body linear force
(Continued)

balances the first intermediate linear force and the second intermediate body moment balances the first intermediate body moment.

20 Claims, 9 Drawing Sheets

Related U.S. Application Data continuation of application No. 15/377,559, filed on Dec. 13, 2016, now Pat. No. 10,351,189.

(51) Int. Cl.
    *B62D 57/02*     (2006.01)
    *B62D 57/024*     (2006.01)
    *B62D 57/032*     (2006.01)

(52) U.S. Cl.
    CPC .......... *B62D 57/02* (2013.01); *B62D 57/024* (2013.01); *G05B 2219/40298* (2013.01); *Y10S 901/01* (2013.01)

(56) References Cited

U.S. PATENT DOCUMENTS

| | | | |
|---|---|---|---|
| 7,112,938 B2* | 9/2006 | Takenaka | B62D 57/032 318/568.17 |
| 7,339,340 B2* | 3/2008 | Summer | B62D 57/032 700/254 |
| 8,428,781 B2 | 4/2013 | Chang et al. | |
| 10,351,189 B2* | 7/2019 | Blankespoor | B25J 9/1694 |
| 10,625,593 B2* | 4/2020 | Gillett | B60K 17/30 |
| 11,667,343 B2 | 6/2023 | Blankespoor et al. | |
| 2002/0022907 A1 | 2/2002 | Takenaka et al. | |
| 2003/0173926 A1* | 9/2003 | Hattori | B62D 57/032 318/567 |
| 2004/0060746 A1* | 4/2004 | Furuta | B25J 19/0091 180/8.6 |
| 2005/0038560 A1* | 2/2005 | Nagasaka | B62D 57/032 700/245 |
| 2005/0055131 A1* | 3/2005 | Mikami | B62D 57/02 318/568.12 |
| 2005/0125099 A1* | 6/2005 | Mikami | B62D 57/032 700/245 |
| 2005/0234593 A1 | 10/2005 | Goswami et al. | |
| 2006/0129278 A1* | 6/2006 | Sugiyama | B62D 57/032 700/245 |
| 2006/0161299 A1 | 7/2006 | Cho et al. | |
| 2006/0241809 A1 | 10/2006 | Goswami et al. | |
| 2006/0247800 A1* | 11/2006 | Takenaka | B62D 57/032 700/54 |
| 2007/0013506 A1* | 1/2007 | Takenaka | B25J 13/085 340/500 |
| 2007/0156283 A1* | 7/2007 | Takenaka | B62D 57/032 700/245 |
| 2007/0260354 A1 | 11/2007 | Hasegawa et al. | |
| 2008/0109115 A1* | 5/2008 | Lim | B62D 57/032 901/1 |
| 2008/0133055 A1* | 6/2008 | Hasegawa | B62D 57/032 901/1 |
| 2008/0133057 A1* | 6/2008 | Hasegawa | B62D 57/032 901/1 |
| 2009/0148035 A1 | 6/2009 | Ohno et al. | |
| 2009/0299523 A1* | 12/2009 | Kim | B62D 57/032 700/245 |
| 2009/0312867 A1* | 12/2009 | Hasegawa | B62D 57/032 700/245 |
| 2011/0040407 A1* | 2/2011 | Lim | B25J 9/162 700/258 |
| 2011/0066283 A1* | 3/2011 | Hammam | B62D 57/032 700/250 |
| 2011/0098857 A1* | 4/2011 | Yoshiike | B62D 57/032 901/1 |
| 2011/0172824 A1 | 7/2011 | Park et al. | |
| 2011/0231050 A1* | 9/2011 | Goulding | G05D 1/0891 180/8.1 |
| 2012/0215354 A1 | 8/2012 | Kransy et al. | |
| 2012/0316684 A1* | 12/2012 | Lee | G06N 3/008 901/1 |
| 2013/0245829 A1 | 9/2013 | Ohta et al. | |
| 2014/0290414 A1 | 10/2014 | Hasuo | |
| 2015/0039128 A1 | 2/2015 | Oaki | |
| 2015/0127141 A1 | 5/2015 | Kawada et al. | |
| 2015/0217448 A1* | 8/2015 | Nagarajan | B62D 57/032 901/1 |
| 2016/0052136 A1* | 2/2016 | Khripin | B25J 9/1664 901/46 |
| 2016/0052574 A1* | 2/2016 | Khripin | B25J 9/1694 901/1 |
| 2016/0089785 A1 | 3/2016 | Kamioka et al. | |
| 2017/0036346 A1 | 2/2017 | Kamioka | |
| 2018/0162469 A1* | 6/2018 | Blankespoor | B62D 57/032 |

FOREIGN PATENT DOCUMENTS

| | | |
|---|---|---|
| EP | 3554773 A1 | 10/2019 |
| EP | 3875229 A1 | 9/2021 |
| EP | 4296151 A2 | 12/2023 |
| JP | S61-030385 | 2/1986 |
| JP | H10-230485 A | 9/1998 |
| JP | 2001-157973 A | 6/2001 |
| JP | 2004-148491 A | 5/2004 |
| JP | 2004-167676 A | 6/2004 |
| JP | 2005-177884 A | 7/2005 |
| JP | 2006-116672 A | 5/2006 |
| JP | 2006-175567 A | 7/2006 |
| JP | 2007-007797 A | 1/2007 |
| JP | 2007-231636 A | 9/2007 |
| JP | 2007-531636 A | 11/2007 |
| JP | 6823172 B2 | 1/2021 |
| JP | 6979140 B2 | 12/2021 |
| JP | 2022-020784 A | 2/2022 |
| JP | 7469282 B2 | 4/2024 |
| WO | WO 2015056178 A1 | 4/2015 |
| WO | WO 2018111653 A1 | 6/2018 |

OTHER PUBLICATIONS

Japanese Office Action received in Application 2021-184675, Dec. 4, 2023, 5 pages.
Japanese Office Action received in Application 2021-001564, Jun. 21, 2022, 8 pages.
Tchon, "Repeatability on Inverse kinematics algorithms for mobile manipulators,"IEEE Transactions on Automatic control, Sep. 2002, 8 pages.
International Search Report in Application No. PCT/US2017/064939 dated Apr. 9, 2018.
Chinese Office Action received in Application 201780075045.7 dated Sep. 3, 2021 in 7 pages.
Chinese Notice of Allowance received in Application 201780075045.7 dated Feb. 16, 2022 in 2 pages.
Japanese Office Action received in Application 2019-521396 dated Aug. 27, 2020 in 3 pages.
Japanese Office Action received in Application 2021-001564 dated Jun. 29, 2021 in 9 pages.
Japanese Office Action received in Application 2021-184675 dated Nov. 2, 2022 in 9 pages.
Japanese Office Action received in Application 2021-184675 dated May 25, 2023 in 11 pages.
European Search Report received in application 21169858.4 dated Jun. 28, 2021 in 2 pages.
Yaguchi et al., "System Evaluation of Life-Related Assistance Study Platform Aero Through Competitions", the 34th Annual Conference of the Robotics Society of Japan, conference abstracts DVDROM, Sep. 7, 2016.
De Santis, "Human-like motion generation for a virtual manikin", Proceedings of IDMME—Virtual Concept 2010, Oct. 20, 2010 (Oct. 20, 2010), pp. 1-7, XP093169373.

(56) References Cited

OTHER PUBLICATIONS

European Search Report received in EP App. No. 23209082.9 dated Jul. 4, 2024 in 14 pages.
Japanese Decision to Grant received in JP App. No. 2021-184675 dated Mar. 12, 2024 in 5 pages.

* cited by examiner

WHOLE BODY MANIPULATION ON A LEGGED ROBOT USING DYNAMIC BALANCE

CROSS REFERENCE TO RELATED APPLICATIONS

This U.S. patent application is a continuation of, and claims priority under 35 U.S.C. § 120 from, U.S. patent application Ser. No. 16/433,779, filed on Jun. 6, 2019, which is a continuation of U.S. patent application Ser. No. 15/377,559, filed on Dec. 13, 2016, each of which is considered part of the disclosure of this application and is hereby incorporated by reference in its entirety.

BACKGROUND

A robot may include a plurality of legs that are operable to balance the robot on a ground surface or to move the robot along the ground surface. The robot may also include one or more end-effectors that allow the robot to manipulate objects or support loads.

SUMMARY

According to example implementations, a robot can operate its legs to dynamically balance itself on a surface while operating its end-effectors. When the legs contact a surface (e.g., ground surface), the legs apply forces to the surface and experience reaction forces from the surface. The robot can dynamically control the legs so that the reaction forces allow the robot to maintain a balance that supports the operation of the end-effectors. The dynamic balancing provided by the legs during operation of the end-effectors constitutes a whole body manipulation that more closely resembles actual motion by actual humans.

According to an example implementation, a robot system includes a body. The body includes: an upper body section including one or more movable end-effectors; a lower body section including one or more legs configured to contact a surface; and an intermediate body section coupling the upper body section and the lower body section. The robot system also includes a control system implemented with one or more processors. The control system includes an upper body control system configured to operate at least one of the end-effectors. The at least one end-effector experiences an end-effector force based on the operation by the upper body control system. The intermediate body section experiences at least one of a first intermediate body linear force or a first intermediate body moment based on the end-effector force. The control system includes a lower body control system configured to operate the one or more legs in response to the operation of the at least one end-effector. The one or more legs experiences respective reaction forces from the surface based on the operation by the lower body control system. The intermediate body section experiences at least one of a second intermediate body linear force or a second intermediate body moment based on the reaction forces. The lower body control system operates the one or more legs so that the second intermediate body linear force balances the first intermediate linear force and the second intermediate body moment balances the first intermediate body moment.

According to another example implementation, a robot system includes a body. The body includes: an upper body section including one or more movable end-effectors; a lower body section including one or more legs configured to contact a surface; and an intermediate body section coupling the upper body section and the lower body section. The robot system includes a control system implemented with one or more processors. The control system includes a lower body control system and an upper control system. A method for controlling a robot system includes operating, with the upper body control system, at least one of the end-effectors. The at least one end-effector experiences an end-effector force based on the operation by the upper body control system. The intermediate body section experiences at least one of a first intermediate body linear force or a first intermediate body moment based on the end-effector force. The method includes operating, with the lower body control system, the one or more legs in response to the operation of the at least one end-effector. The one or more legs experiences respective reaction forces from the surface based on the operation by the lower body control system. The intermediate body section experiences at least one of a second intermediate body linear force or a second intermediate body moment based on the reaction forces.

According to yet another example implementation, a robot system includes a body. The body includes: an upper body section including one or more movable end-effectors; a lower body section including one or more legs configured to contact a surface; and an intermediate body section coupling the upper body section and the lower body section. The robot system includes a control system implemented with one or more processors. The control system includes an upper body control system configured to operate at least one of the end-effectors. The at least one end-effector experiences an end-effector force based on the operation by the upper body control system. The intermediate body section experiences at least one of a first intermediate body linear force or an first intermediate body moment based on the at least one end-effector force. The control system includes a lower body control system configured to operate the one or more legs based on the first intermediate body linear force or the first intermediate body moment. The one or more legs experiences respective reaction forces from the surface based on the operation by the lower body control system. The intermediate body section experiences at least one of a second intermediate body linear force or a second intermediate body moment based on the reaction forces. The lower body control system operates the one or more legs so that the second intermediate body linear force balances the first intermediate linear force and the second intermediate body moment balances the first intermediate body moment. The upper body control system processes the lower body section as a virtual link coupled to the intermediate body section. The lower body control system is further configured to position the intermediate body section according to a first set of degrees of freedom based on the operation of the one or more legs. The upper body control system is further configured to position the intermediate body section according to a second set of degrees of freedom based on the operation of the at least one end-effector The upper body control system is constrained from positioning the intermediate body section according to the first set of degrees of freedom.

According to a further example implementation, a robot system includes a body. The body includes: an upper body section; a lower body section including one or more legs configured to contact a surface; and an intermediate body section coupling the upper body section and the lower body section. The robot system includes a control system implemented with one or more processors. The control system includes an upper body control system configured to operate the upper body section. The upper body section experiences an upper body force in response to the operation by the upper body control system. The intermediate body section experiences at least one of a first intermediate body linear force or a first intermediate body moment based on the upper body force. The control system includes a lower body control system configured to operate the one or more legs. The one or more legs experiences respective reaction forces from the surface based on the operation by the lower body control system. The intermediate body section experiences at least one of a second intermediate body linear force or a second intermediate body moment based on the reaction forces. The lower body control system operates the one or more legs so that the second intermediate body linear force balances the first intermediate linear force and the second intermediate body moment balances the first intermediate body moment.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
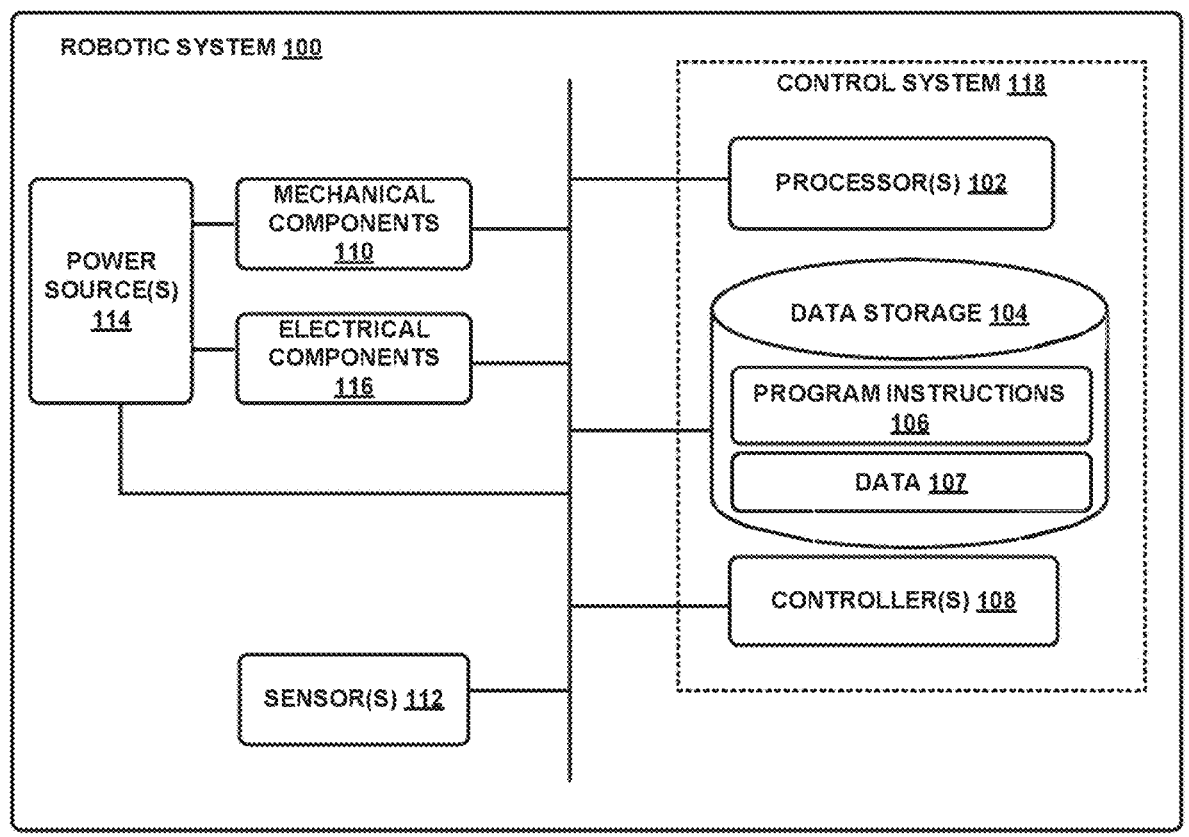
FIG. 1 illustrates a configuration of a robotic system according to an example implementation.

The following detailed description describes various features and functions of the disclosed systems and methods with reference to the accompanying figures. The illustrative system and method embodiments described herein are not meant to be limiting. It will be readily understood that certain aspects of the disclosed systems and methods can be arranged and combined in a wide variety of different configurations, all of which are contemplated herein.

I. Overview

A robot may include a plurality of legs that are operable to balance the robot on a ground surface or to move the robot along the ground surface. The robot may also include one or more end-effectors that allow the robot to manipulate objects or support loads. According to one approach, the robot must first operate its legs to maintain position control and establish static balance before it can position the end-effectors to perform a task. For instance, the robot may initially operate the legs to form a static support polygon over which the center of mass of the robot is maintained during the positioning and operation of the end-effectors. According to this approach, the legs and the end-effectors are not simultaneously manipulated to act as a whole body.

According to example implementations disclosed herein, however, a robot can operate its legs to dynamically balance itself on a surface while it operates end-effectors. When the legs contact a surface (e.g., ground surface), the legs apply forces to the surface and experience reaction forces from the surface. The robot can dynamically control the legs so that the reaction forces allow the robot to maintain a balance that supports the operation of the end-effectors. The dynamic balancing provided by the legs during operation of the end-effectors constitutes a whole body manipulation that may more closely resemble actual motion by actual humans.

The legs can dynamically balance the robot even while the robot is moving according to a gait. For instance, the robot can walk or run along a ground surface, and due to dynamic balancing, the robot can simultaneously position the end-effector to grab an object without interrupting the gait.

In example implementations, the robot includes a lower body section, an upper body section, and an intermediate body section. For a bipedal robot, the intermediate section may act as, or resemble, a pelvis. The lower body section includes the legs and the upper body section includes the end-effectors. In some cases, the end-effectors may be disposed on the ends of arms that can extend outwardly from the robot to position the end-effectors. The lower body section is coupled to the intermediate section from below, and the upper body section is coupled to the intermediate section from above.

The robot includes a lower body control system and an upper body control system. The lower body control system controls the legs, and the upper body control system controls the end-effectors. The lower body control system and the upper body control system coordinate to achieve whole body manipulation and balance for the robot. In particular, the lower body control system controls the legs so that the reaction forces from the surface provide a dynamic balance that allows the upper body control system to perform tasks with the end-effectors.

During its analysis, the upper body control system represents and processes the lower body section as a virtual link coupled to the intermediate body section. To position and operate the end-effectors, the upper body control system employs an inverse kinematics solver that accounts for the virtual link as well as the position and orientation of the intermediate body section. Inverse kinematics refers to the use of the kinematics equations of the robot to determine the parameters for components (e.g., joints) to allow an end-effector to reach a target position and perform a task. A motion plan specifies the movement of the robot so that the end-effector can reach a target position and perform a task. For instance, the inverse kinematics solver may use the velocity of the virtual link to determine a motion plan for the upper body section that achieves desired end-effector velocities in a static world frame. Inverse kinematics transforms the motion plan into actuator trajectories for components (e.g., joints) of the robot.

To position the end-effectors, the upper body control system may reposition/reorient the intermediate body section. In general, the intermediate body section can be positioned and oriented according to any one or more of six degrees of freedom. To achieve dynamic balance, however, the lower body control system may need to reposition/reorient the intermediate body section according to one or more of these six degrees of freedom. As such, to maintain the dynamic balance, the upper body control system may be constrained from repositioning/reorienting the intermediate body section according to the degrees of freedom needed by the lower body control system to achieve the dynamic balance. In other words, the inverse kinematics solver for the upper body control system treats these particular degrees of freedom as constraints. These constraints free the lower body control system to balance dynamically.

The loads supported by the end-effectors generate a resulting linear force and/or moment on the intermediate body section. The upper body control system can determine the resulting linear force and moment and communicate this information to the lower body control system. In response, the lower body control system can operate the legs so that the reaction forces can balance the linear force and/or moment at the intermediate body section. In general, a first force/moment is balanced by a second force/moment, when the second force/moment directionally opposes the first force/moment with at least substantially the same magnitude.

Such balancing can also be employed when other loads are additionally or alternatively experienced by the upper body section. For instance, upper body section may experience dynamic forces, such as forces required to accelerate an arm, an end-effector, or a payload, during high-speed motions. Such dynamic forces also generate a resulting linear force and/or moment on the intermediate body section, which the lower body control can also balance with the reaction forces.

Additionally, when the upper body control system wants to extend the end-effectors to a target position, the lower body control system can determine whether the current position of the legs allows the end-effectors to reach the target position with sufficient balance. If necessary, the legs can be operated to move the robot along the surface so that the end-effectors can reach the target position.

II. Example Robotic Systems

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred to as a quadruped. Implementations with six or eight legs are also possible. For purposes of illustration, biped and quadruped implementations of the robotic system 100 are described below.

Figure 2:
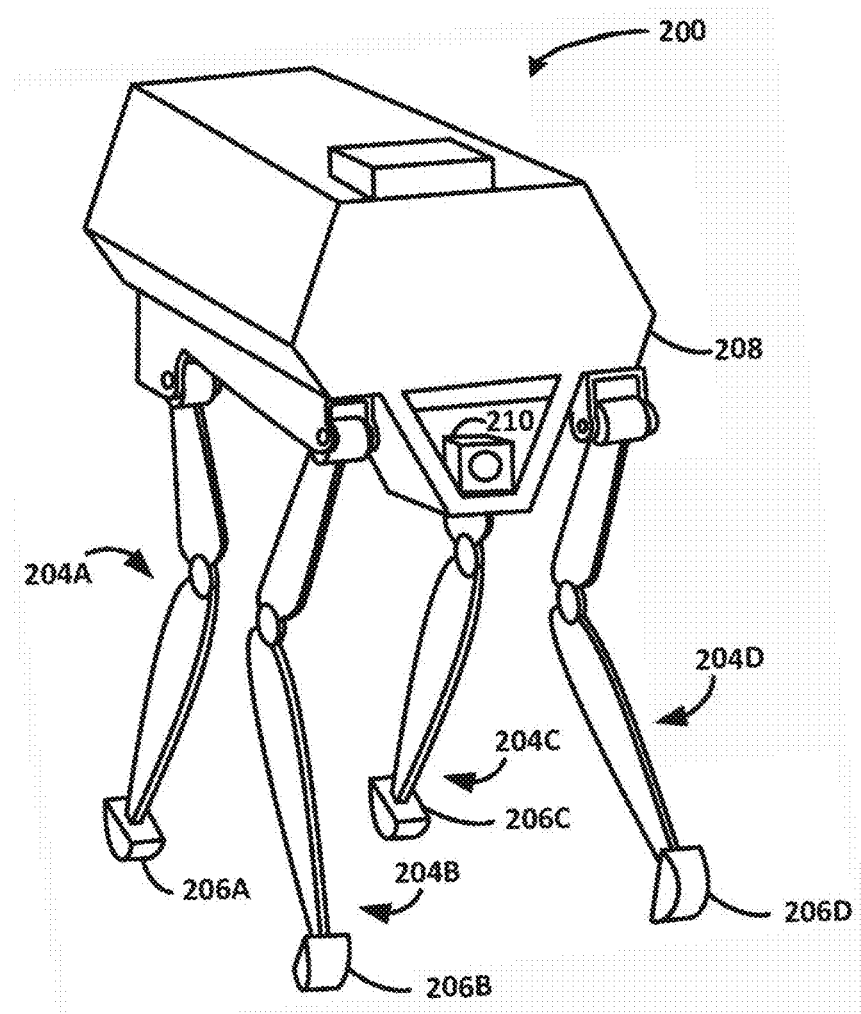
FIG. 2 illustrates a quadruped robot according to an example implementation.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems.

The configuration, position, and/or structure of the legs 204A-204D may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
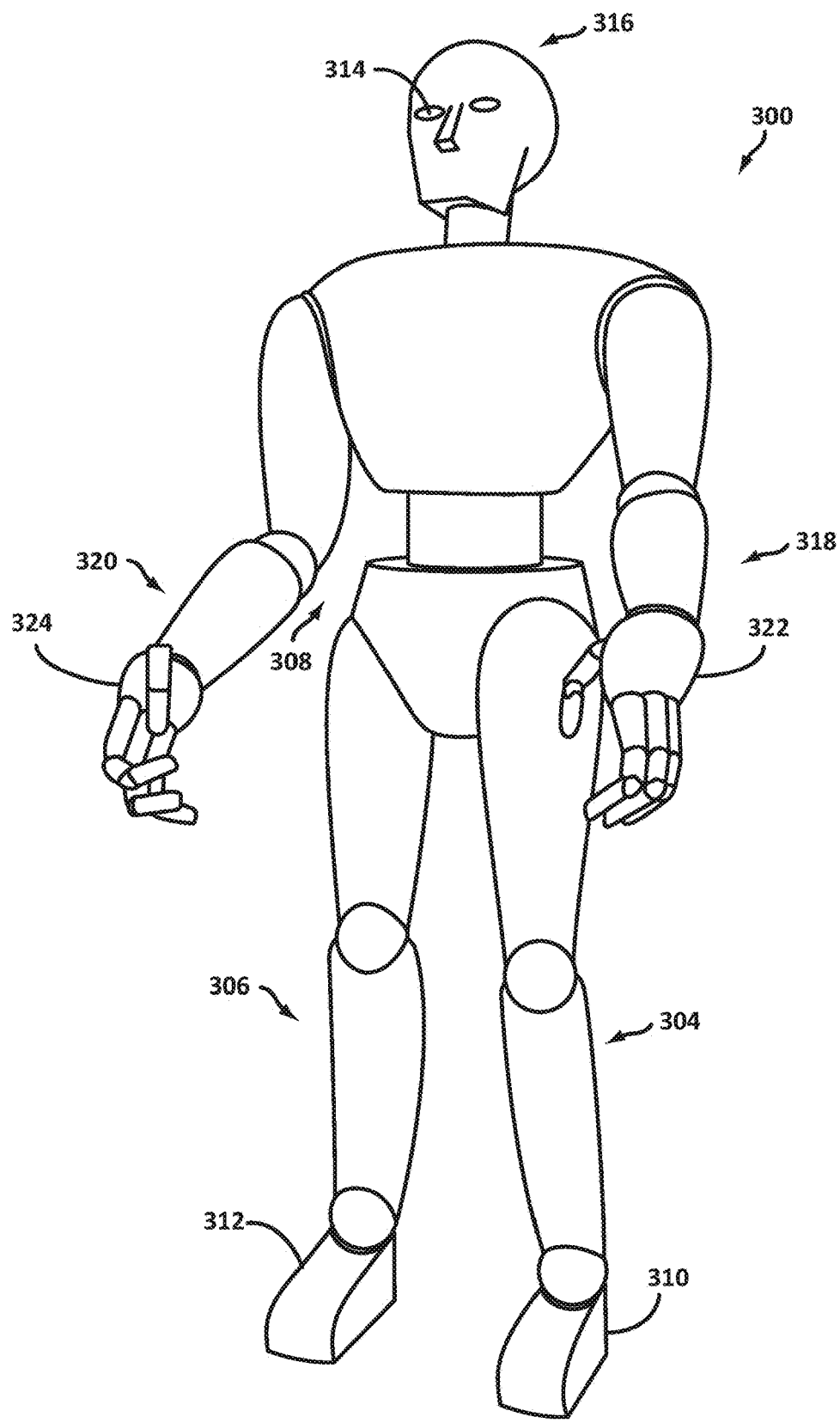
FIG. 3 illustrates a biped robot according to an example implementation.

FIG. 3 illustrates a biped robot 300 according to another example implementation. Similar to robot 200, the robot 300 may correspond to the robotic system 100 shown in FIG. 1, and may be configured to perform some of the implementations described herein. Thus, like the robot 200, the robot 300 may include one or more of mechanical components 110, sensor(s) 112, power source(s) 114, electrical components 116, and/or control system 118.

For example, the robot 300 may include legs 304 and 306 connected to a body 308. Each leg may consist of one or more members connected by joints and configured to operate with various degrees of freedom with respect to one another. Each leg may also include a respective foot 310 and 312, which may contact a surface (e.g., the ground surface). Like the robot 200, the legs 304 and 306 may enable the robot 300 to travel at various speeds according to the mechanics set forth within gaits. The robot 300, however, may utilize different gaits from that of the robot 200, due at least in part to the differences between biped and quadruped capabilities.

The robot 300 may also include arms 318 and 320. These arms may facilitate object manipulation, load carrying, and/or balancing for the robot 300. Like legs 304 and 306, each arm may consist of one or more members connected by joints and configured to operate with various degrees of freedom with respect to one another. Each arm may also include a respective hand 322 and 324. The robot 300 may use hands 322 and 324 for gripping, turning, pulling, and/or pushing objects. The hands 322 and 324 may include various types of appendages or attachments, such as fingers, grippers, welding tools, cutting tools, and so on.

The robot 300 may also include sensor(s) 314, corresponding to sensor(s) 112, and configured to provide sensor data to its control system. In some cases, the locations of these sensors may be chosen in order to suggest an anthropomorphic structure of the robot 300. Thus, as illustrated in FIG. 3, the robot 300 may contain vision sensors (e.g., cameras, infrared sensors, object sensors, range sensors, etc.) within its head 316.

III. Example Robot Employing Dynamic Balance for Whole Body Manipulation

Figure 4A:
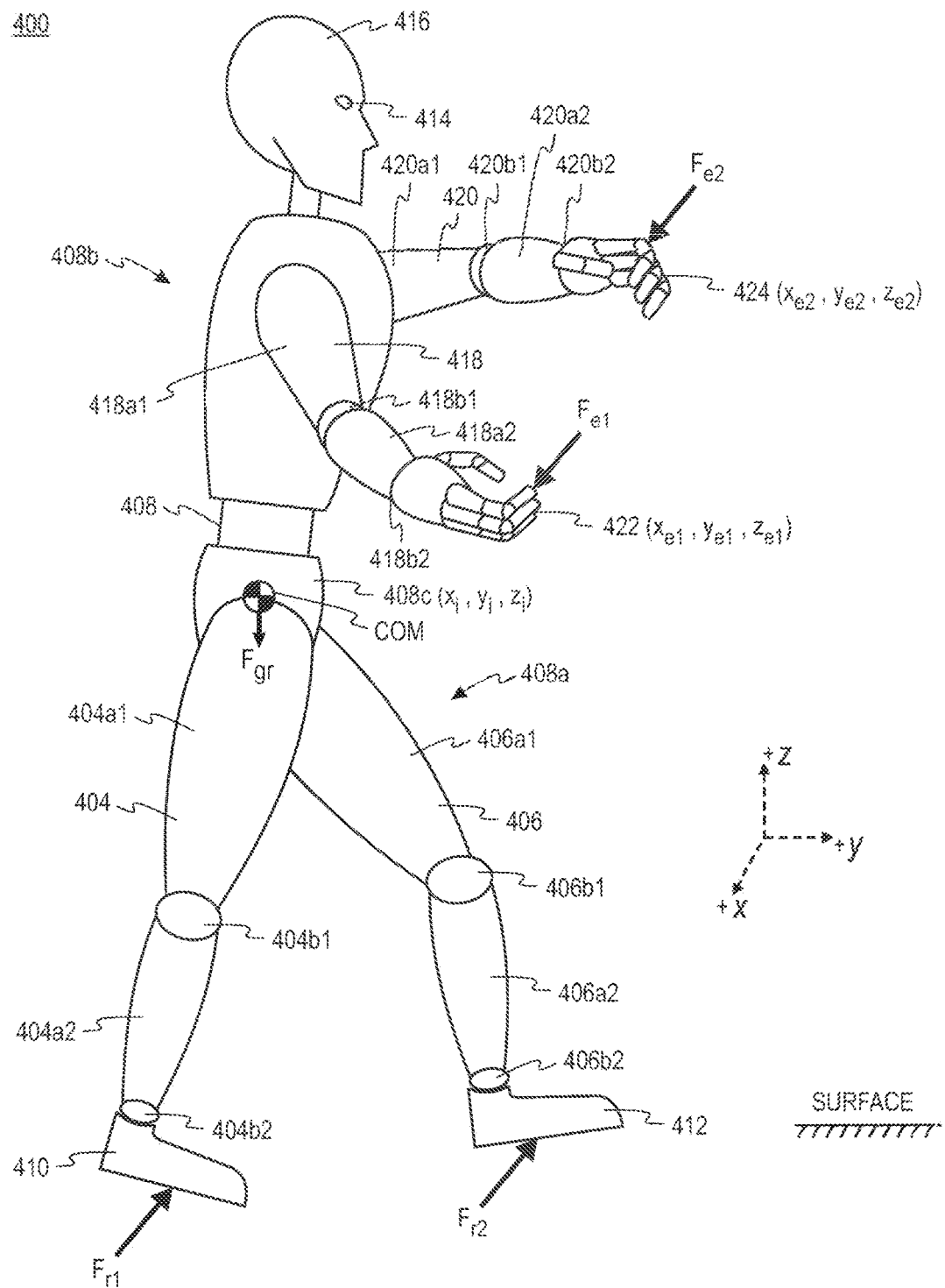
FIG. 4A illustrates a biped robot where dynamic balance is employed for whole body manipulation according to an example implementation.

FIG. 4A illustrates an example biped robot 400 that includes a body 408 defined by a lower body section 408a, an upper body section 408b, and an intermediate body section 408c. The lower body section 408a and the upper body section 408b are coupled to the intermediate body section 408c. The lower body section 408a includes two legs 404 and 406 that generally extend downward to a surface (e.g., ground surface) from the intermediate body section 408c. Like the legs 304 and 306 of the robot 300, each leg 404, 406 may include one or more members connected by joints and configured to operate with various degrees of freedom with respect to one another. As shown in FIG. 4A, for instance, the leg 404 includes at least members 404a1-a2 and joints 404b1-b2, and the leg 406 includes at least members 406a1-a2 and joints 406b1-b2.

Each leg 404, 406 may also include a respective foot 410, 412 to establish direct contact with the surface. The legs 404, 406 can stably support the robot 400 on the surface. Additionally, the legs 404, 406 enable the robot 400 to move at various speeds according to the mechanics for different gaits. As shown in FIG. 4A, for instance, the legs 404, 406 are operable to move the robot 400 according to at least forward/backward translation along a y-axis and/or left/right lateral translation along a x-axis.

The upper body section 408b includes end-effectors 422, 424 disposed on the ends of respective arms 418, 420. The arms 418, 420 may extend outwardly from the upper body section 408b to position the respective end-effectors 422, 424. Like the arms 318, 320 of the robot 300, each arm 418, 420 may include one or more members connected by joints and configured to operate with various degrees of freedom with respect to one another. As shown in FIG. 4A, for instance, the arm 418 includes at least members 418a1-a2 and joints 418b1-b2, and the arm 420 includes at least members 420a1-a2 and joints 420b1-b2.

The end-effectors 422, 424 may be employed to perform a task by manipulating objects, acting on loads, etc. For instance, the robot 400 may use the end-effector 422, 424 for gripping, turning, carrying, pulling, and/or pushing objects. As shown, the end-effectors 422, 424 may be hand-like structures with movable fingers. Alternatively, the end-effectors 422, 424 may include other types of appendages or attachments, such as grippers, welding tools, cutting tools, and the like.

As shown in FIG. 4A, the intermediate body section 408c acts as, or resembles, a pelvis for the bipedal configuration of the robot 400. The intermediate body section 408c is supported by the lower body section 408a below, and correspondingly, the intermediate body section 408c supports the upper body section 408b above. As described further below, the intermediate body section 408c may be positioned and/or oriented to allow for desired positioning and operation of the legs 404, 406 and the end-effectors 422, 424.

The robot 400 may include aspects of the robotic system 100 described above. In particular, sensors similar to the sensors 112 may provide information regarding the position and movement of a component of the robot 400 relative to other components and/or the external environment. As shown in FIG. 4A, for instance, the robot 400 may include sensors 414 (e.g., cameras, infrared sensors, object sensors, range sensors, etc.) within a head 416.

Figure 5:
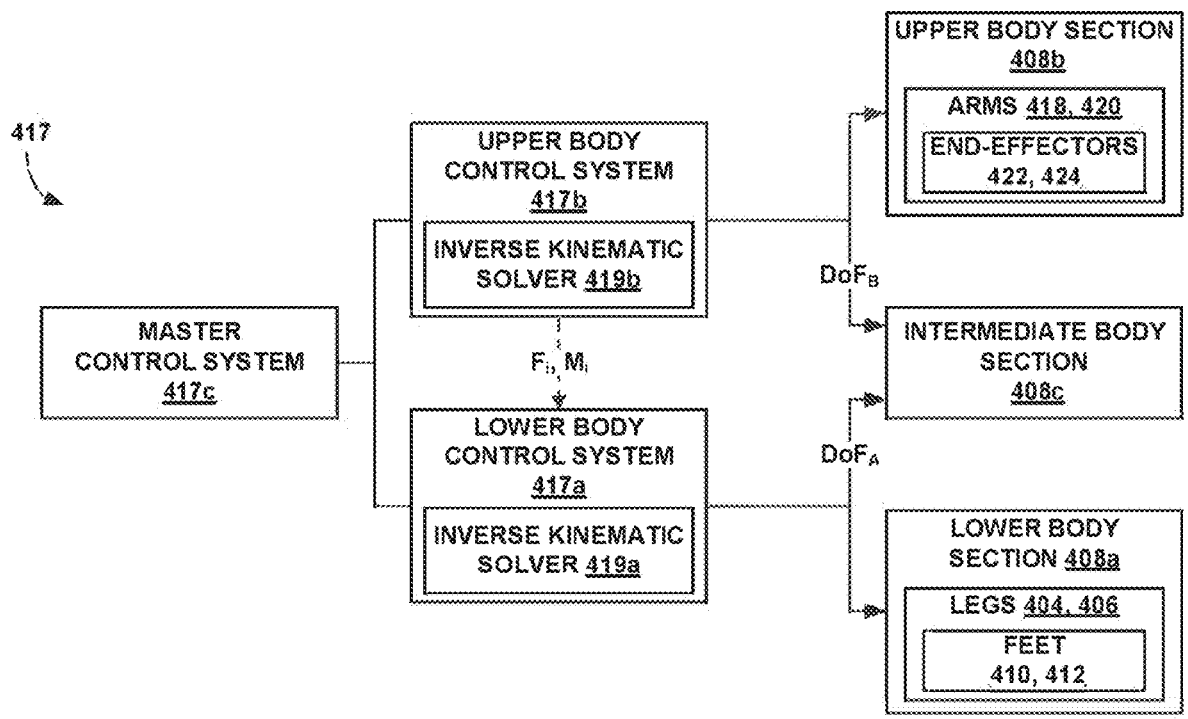
FIG. 5 illustrates a configuration of a robotic system where dynamic balance is employed for whole body manipulation according to an example implementation.

Furthermore, as shown in FIG. 5, the robot 400 may include a control system 417 with a lower body control system 417a, an upper body control system 417b, and a master control system 417c, each of which may include aspects of the control system 118 described above. The lower body control system 417a can operate aspects of the lower body section 408a. The upper body control system 417b can operate aspects of the upper body section 408b. The master controller 417c can control other aspects of the robot 400. The master controller 417c may also coordinate the actions of the lower body control system 417a and the upper body control system 417b.

Each of the control systems 417a-c may receive sensor data from the sensors to operate respective aspects of the robot 400. Although the control systems 417a-c are shown as separate elements in FIG. 5, aspects of the control systems 417a-c may be implemented with common hardware and/or software.

To achieve the desired positions for the feet 410, 412 and/or the desired forces with the legs 404, 406, the lower body control system 417a may employ an inverse kinematics solver 419a to determine the corresponding positions of the joints and the orientations of the members of the respective legs 404, 406. Meanwhile, to achieve desired positions for the end-effectors 422, 424, the upper body control system 417a may employ an inverse kinematics solver 419b to determine the corresponding positions of the joints and the orientations of the members of the respective arms 418, 420.

In general, inverse kinematics refers to the use of the kinematics equations of the robot 400 to determine the parameters for components, such as the joints of a leg 404, 406 or an arm 418, 420, to allow the respective foot 410, 412 or end-effector 422, 424 to reach a target position. A motion plan specifies the movement of the robot so that the foot 410, 412 or the end-effector 422, 424 can reach a target position. The inverse kinematics solver 419a, 419b transforms the motion plan into actuator trajectories for components (e.g., the joints) of the robot 400.

The lower body control system 417a can operate the legs 404, 406 to balance the robot 400 dynamically on the surface, while the upper body control system 417b operates the arms 418, 420 and the end-effectors 422, 424 to perform a task. As shown in FIG. 4A, when the foot 410 is in contact with the surface, the leg 404 experiences a reaction force $F_{r1}$ in response to the force applied by the leg 404. Similarly, when the foot 412 is in contact with the surface, the leg 406 experiences a reaction force $F_{r2}$ in response to the force applied by the leg 406. Each reaction force $F_{r1}$, $F_{r2}$ may include components along one or more of the x-, y-, and z-axes.

The lower body control system 417a can dynamically control the legs 404, 406 so that the reaction forces $F_{r1}$, $F_{r2}$ allow the robot 400 to maintain a balance that supports the operation of the arms 418, 420 and the end-effectors 422, 424. In response to any moments experienced by the robot 400, the reaction forces $F_{r1}$, $F_{r2}$ may also produce opposing moments $M_{r1}$, $M_{r2}$, respectively, (not shown) to balance the robot 400. The dynamic balancing provided by the legs 404, 406 during operation of the end-effectors 422, 424 constitutes a whole body manipulation that more closely resembles actual motion by actual humans.

A. Example Balancing with the Lower Body

Figure 4B:
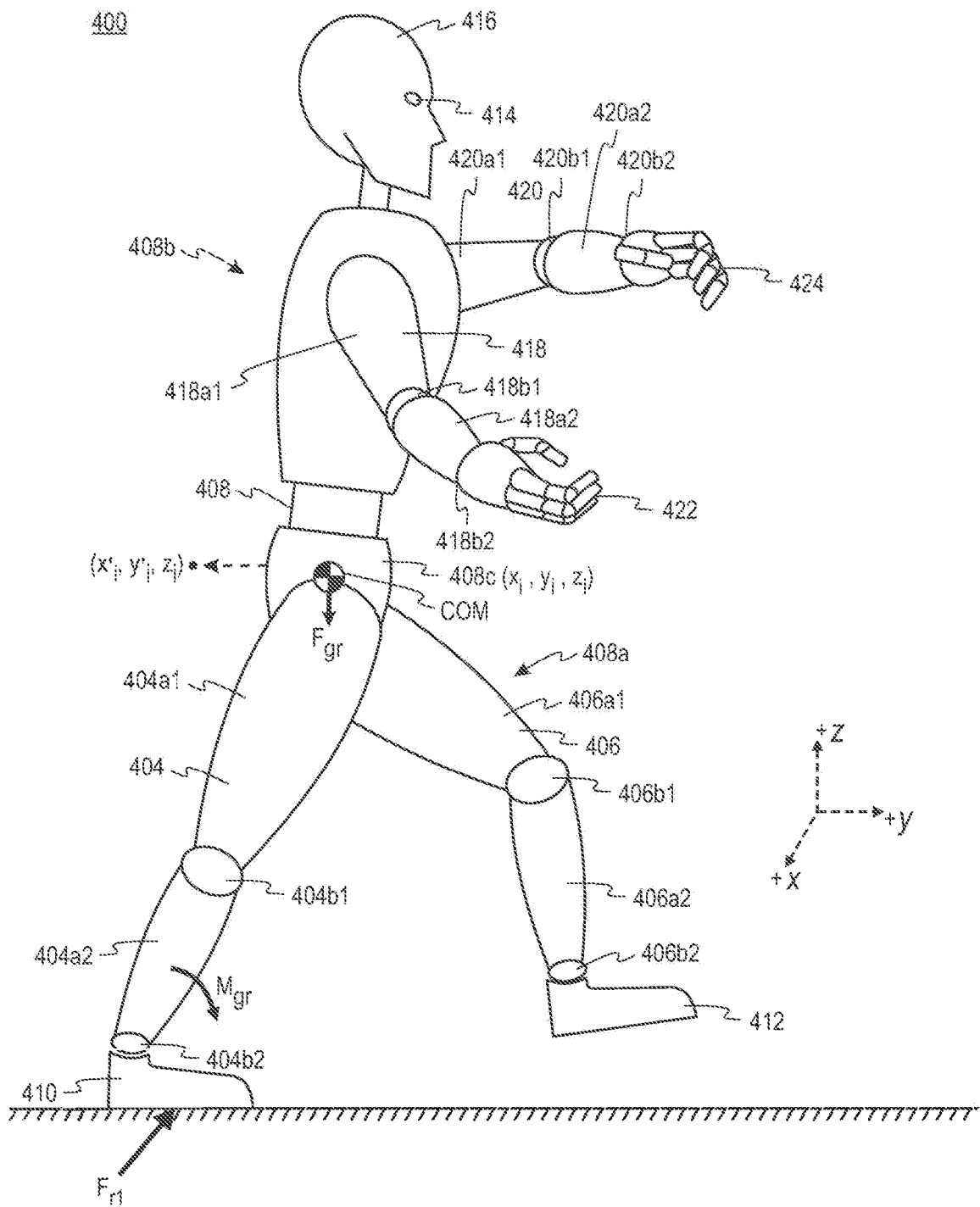
FIG. 4B illustrates an example of dynamic balancing by the biped robot of FIG. 4A according to an example implementation.

Referring to FIG. 4B, the robot 400 is supported on the surface solely by the leg 404. The weight of the robot 400, i.e., a gravitational force $F_{gr}$, is applied via the foot 410 in the negative z-direction to the surface. The gravitational force $F_{gr}$ effectively acts at the center of mass (COM) of the body 408 in the negative z-direction. A component of the reaction force $F_{r1}$ is applied in the positive z-direction at the foot 410 with a magnitude equal to the gravitational force $F_{gr}$. Thus, the gravitational force $F_{gr}$ is balanced by the z-component of the reaction force $F_{r1}$.

If, however, the center of mass of the robot 400 is not aligned with the foot 410 along the x-axis and/or y-axis, the gravitational force $F_{gr}$ may produce a moment $M_{gr}$ at the foot 410. The moment $M_{gr}$ may include components about the x-axis and/or y-axis. The reaction force $F_{r1}$ includes a frictional force between the foot 410 and the surface, where the frictional force acts on the foot 410 in the x- and/or y-directions. The frictional force provides a torque that opposes the moment $M_{gr}$ produced by the gravitational force $F_{gr}$. If the moment $M_{gr}$ does not exceed the maximum torque that can be provided by the frictional force, the robot 400 can maintain a balance. On the other hand, if the moment $M_{gr}$ exceeds the maximum torque, the foot 410 may slip and the moment $M_{gr}$ may cause the robot 400 to lose balance.

With the foot 410 in a given position on the surface, the lower body control system 417a can control the positions and orientations of the members 404a1-a2 and joints 404b1-b2 to control the effect of the reaction forces $F_{r1}$ on the leg 404 and to achieve a balance the body 408. For instance, if the lower body control system 417a determines that the robot 400 as shown in FIG. 4B cannot maintain balance due to the moment $M_{gr}$, the lower body control system 417a can control the members 404a1-a2 and the joints 404b1-b2 of the leg 404 to reposition the center of mass of the robot 400 into closer alignment with the foot 410 along the x-axis and/or y-axis. This can reduce the moment $M_{gr}$ and allow the frictional force from the reaction force $F_{r1}$ to balance the robot 400 as described above.

As shown in FIG. 4B, when the lower body control system 417a repositions the center of mass, the intermediate body section 408c may correspondingly move in the x- and y-directions from a position $(x_i, y_i, z_i)$ to a new position $(x_i', y_i', z_i')$. Although the center of mass in FIG. 4B may appear to coincide with the intermediate body section 408c, it is understood that the center of mass may be located at other positions relative to the robot 400.

Although not shown in FIG. 4B, the leg 406 may be manipulated in a manner similar to the leg 404. In general, with the feet 410, 412 in given positions on the surface, the lower body control system 417a can reposition and/or reorient the members and joints of the legs 404, 406 to control how the reaction forces $F_{r1}$ and $F_{r2}$ affect the body 408. Specifically, the lower body control system 417a can control the legs so that the reaction forces $F_{g1}$ and $F_{g2}$ balance the body 408.

Indeed, both feet 410, 412 can simultaneously contact the surface and the legs 404, 406 may experience reaction forces $F_{r1}$ and $F_{r2}$. The gravitational force $F_{gr}$ can be balanced by the sum of the z-components of the reaction forces $F_{r1}$ and $F_{r2}$. In addition, the lower body control system 417a may control the members and joints of both legs 404, 406 to change the position of the center of mass and allow opposing moments $M_{r1}$, $M_{r2}$ from the reaction forces $F_{r1}$, $F_{r2}$ (e.g., frictional forces) to balance the moment $M_{gr}$ from the gravitational force $F_{gr}$.

B. Dynamic Balancing with the Lower Body to Support Operation of End-Effectors

As described above, the upper body control system 417b can operate each end-effector 422, 424 to perform a respective task. To perform different tasks, the upper body control system 417b can move the end-effectors 422, 424 with the arms 418, 420 to different positions in order to reach and move objects, act on loads, etc.

Figure 4C:
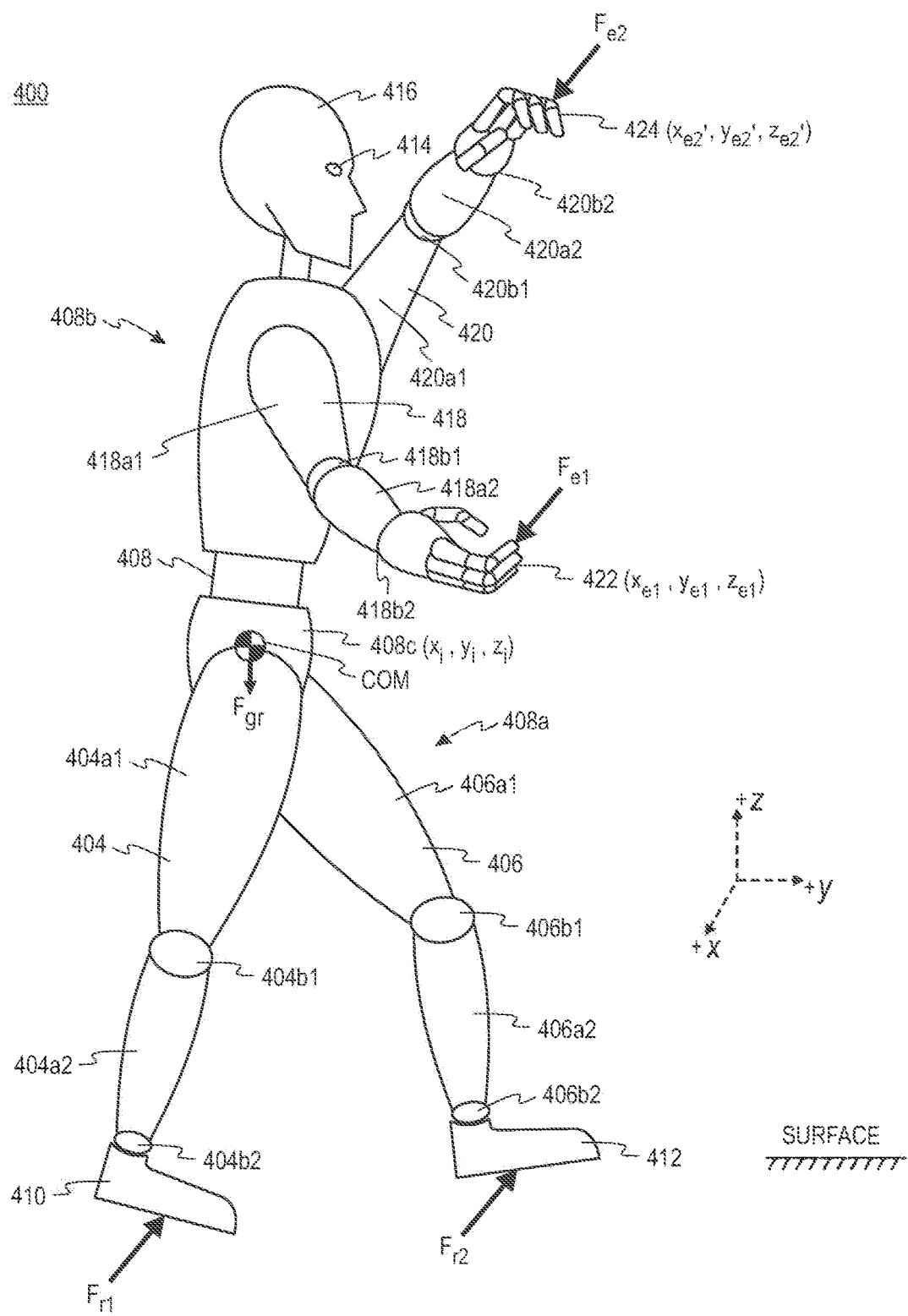
FIG. 4C illustrates another example of dynamic balancing by the biped robot of FIG. 4A while the robot operates an end-effector according to an example implementation.

As shown in FIG. 4A, for instance, the end effector 424 is initially positioned at coordinates $(x_{e2}, y_{e2}, z_{e2})$. In FIG. 4C, the upper body control system 417b repositions the end effector 424 to $(x_{e2}', y_{e2}', z_{e2}')$ to perform a task. To reposition, the upper body control system 417b operates the members 420a1-a2 and joints 420b1-b2 of the arm 420 to extend the end-effector 424 to the target position $(x_{e2}', y_{e2}', z_{e2}')$.

Depending on the mass associated with the arms 418, 420, the position of the center of mass of the robot 400 may change when the arms 418, 420 and corresponding end-effectors 422, 424 are repositioned. The change in the position of the center of mass changes the effect of the gravitational force $F_{gr}$ on the body 408. In particular, the moment $M_{gr}$ produced by the gravitational force $F_{gr}$ also changes. To maintain the balance of the robot 400, the members and joints of the legs 404, 406 may need to be repositioned and/or reoriented to achieve reaction forces $F_{r1}$, $F_{r2}$ that balance the new moment Mg.

When performing a task, each end-effector 422, 424 may also experience a respective external end-effector force $F_{e1}$, $F_{e2}$, as shown in FIG. 4A. For instance, if each end-effector 422, 424 is tasked with carrying a respective object, the respective end-effector force $F_{e1}$, $F_{e2}$ may include the weight of the respective object acting in the negative z-direction. In another instance, if the end-effectors 422, 424 are tasked with pushing a large object along the surface, the end-effector forces $F_{e1}$ and $F_{e2}$ may include the opposing frictional forces between the large object and the surface. Although both end-effector forces $F_{e1}$ and $F_{e2}$ are shown in FIG. 4A, the end-effectors 410, 412 do not necessarily experience the end-effector forces $F_{e1}$ and $F_{e2}$ simultaneously.

The robot 400 may thus experience the external forces $F_{e1}$ and $F_{e2}$ in addition to the gravitational force $F_{gr}$. In addition, the robot 400 may experience moments $M_{e1}$, $M_{e2}$ produced by the end-effector forces $F_{e1}$, $F_{e2}$, respectively. As such, the lower body control system 417a can also account for the effects of the external end-effector forces $F_{e1}$ and $F_{e2}$ as well as the gravitational force $F_{gr}$ to balance the robot 400 on the surface. In particular, the lower body control system 417a can control the members and joints of the legs 404, 406 to allow the reaction forces $F_{r1}$, $F_{r2}$ to balance the sum of the forces $F_{e1}$, $F_{e2}$, $F_{gr}$ as well as the sum of moments produced by forces $F_{e1}$, $F_{e2}$, $F_{gr}$.

For instance, if each end-effector 422, 424 is carrying an object, the end-effector forces $F_{e1}$, $F_{e2}$ include the weight of each object acting in the negative z-direction. In addition to the gravitational force $F_{gr}$, the legs 404, 406 apply the weight of each object to the surface via the feet 410, 412. The reaction forces $F_{r1}$, $F_{r2}$ correspondingly apply a force in the positive z-direction to balance the forces applied by the legs 404, 406.

Moreover, in addition to the moment $M_{gr}$ produced by the gravitational force $F_{gr}$, the forces $F_{e1}$, $F_{e2}$ also produce moments $M_{e1}$, $M_{e2}$. The reaction forces $F_{r1}$, $F_{r2}$ correspondingly produce moments $M_{r1}$, $M_{r2}$ that oppose the moments $M_{e1}$, $M_{e2}$. The lower body control system 417a can operate the members and joints of the legs 404, 406 so that moments $M_{r1}$, $M_{r2}$ can balance the moments $M_{e1}$, $M_{e2}$. For instance, the reaction forces $F_{r1}$, $F_{r2}$ may include frictional forces that act in the positive y-direction and provide a torque to oppose the moments $M_{e1}$, $M_{e2}$.

To allow the lower body control system 417a to account for the forces and moments produced by the positioning and manipulation of the end-effectors 422, 424, the upper control system 417b may communicate information to the lower body control system 417a relating to the position of the end-effectors 422, 424 as well as the end-effector forces $F_{e1}$, $F_{e2}$ and moments $M_{e1}$, $M_{e2}$. The upper body control system 417b, for instance, may receive signals from force and torque sensors to determine the end-effector forces $F_{e1}$, $F_{e2}$ and moments $M_{e1}$, $M_{e2}$.

The upper body control system 417b may control the end-effectors 422, 424 to perform any number and sequence of tasks. As such, the arms 418, 420 and the end-effectors 422, 424 may be in constant motion and may experience varying end-effector forces $F_{e1}$, $F_{e2}$. Advantageously, the lower body control system 417a can dynamically balance the body 408 to support the actions of the upper body section 408b. The lower body control system 417a can simultaneously operate the legs 404, 406 as described above to provide continuous balance for continuous activity by the upper body section 408b. The upper body control system 417b does not rely on the lower body control system 417a to establish a static balance before operating the end-effectors 422, 424 to perform each task.

Because the lower body control system 417a controls the lower body section 408a, the upper body control system 417b can control the upper body section 408b by representing and processing the lower body section 408a as a virtual link connected via the intermediate body section 408c. With the virtual link, the implementation of the control system 417 is simplified because control of the lower body section 408a and the upper body 408b are divided between the lower body control system 417a and the upper body control system 417b, respectively. The upper body control system 417b can generally assume that the lower body control system 417a will dynamically provide the balance to support the upper body section 408b as the upper body control system 417b can focus on performing tasks with the end-effectors 422, 424.

In addition to operating the arms 418, 420, the upper body control system 417b can position and/or orient the intermediate body section 408c relative to the lower body section 408b to position and operate the end-effectors 422, 424. The intermediate body section 408c can be positioned and/or oriented according to any one or more of the six degrees of freedom: (1) forward/backward translation along the y-axis; (2) left/right lateral translation along the x-axis; (3) up/down translation along the z-axis; (4) pitch rotation about the x-axis; (5) roll rotation about the y-axis; and (6) yaw rotation about the z-axis. For instance, to reach an object to the left of the robot 400, the upper body control system 417b may cause the intermediate body section 408c to rotate about the z-axis (i.e., yaw rotation).

As described in an example above, the lower body control system 417a may reposition the center of mass of the robot 400 along the x-axis and/or the y-axis to balance the body 408. This may also involve movement by the intermediate body section 408c along the x-axis (left/right lateral translation) and/or the y-axis (forward/backward translation). Thus, to balance the body 408 with the lower body section 408a, the lower body control system 417a may need to control one or more degrees of freedom of the intermediate body section 408c.

As a result, the upper body control system 417b may be constrained from moving the intermediate body section 408c according to degrees of freedom that may affect the ability of the lower body section 408a to balance dynamically. The constraints free the lower body control system 417a to balance dynamically. Such constraints allow the upper body control system 117b to represent or consider the lower body section 408a as the virtual link connected via the intermediate body section 408c.

For instance, if the lower body control system 417a needs to control the position of the intermediate body section 408c along the x-axis (left/right lateral translation) and/or the y-axis (forward/backward translation), the upper body control system 417b may be constrained from those degrees of freedom. The inverse kinematics solver 419b for the upper body control system 417b may treat these two degrees of freedom as constraints when determining the positioning of the end-effectors 422, 424.

As a result, the upper body control system 417b controls the position of the intermediate body section 408c according to any of the remaining four degrees of freedom, i.e., up/down translation along the z-axis, pitch rotation about the x-axis, roll rotation about the y-axis, and yaw rotation about the z-axis.

Figure 4D:
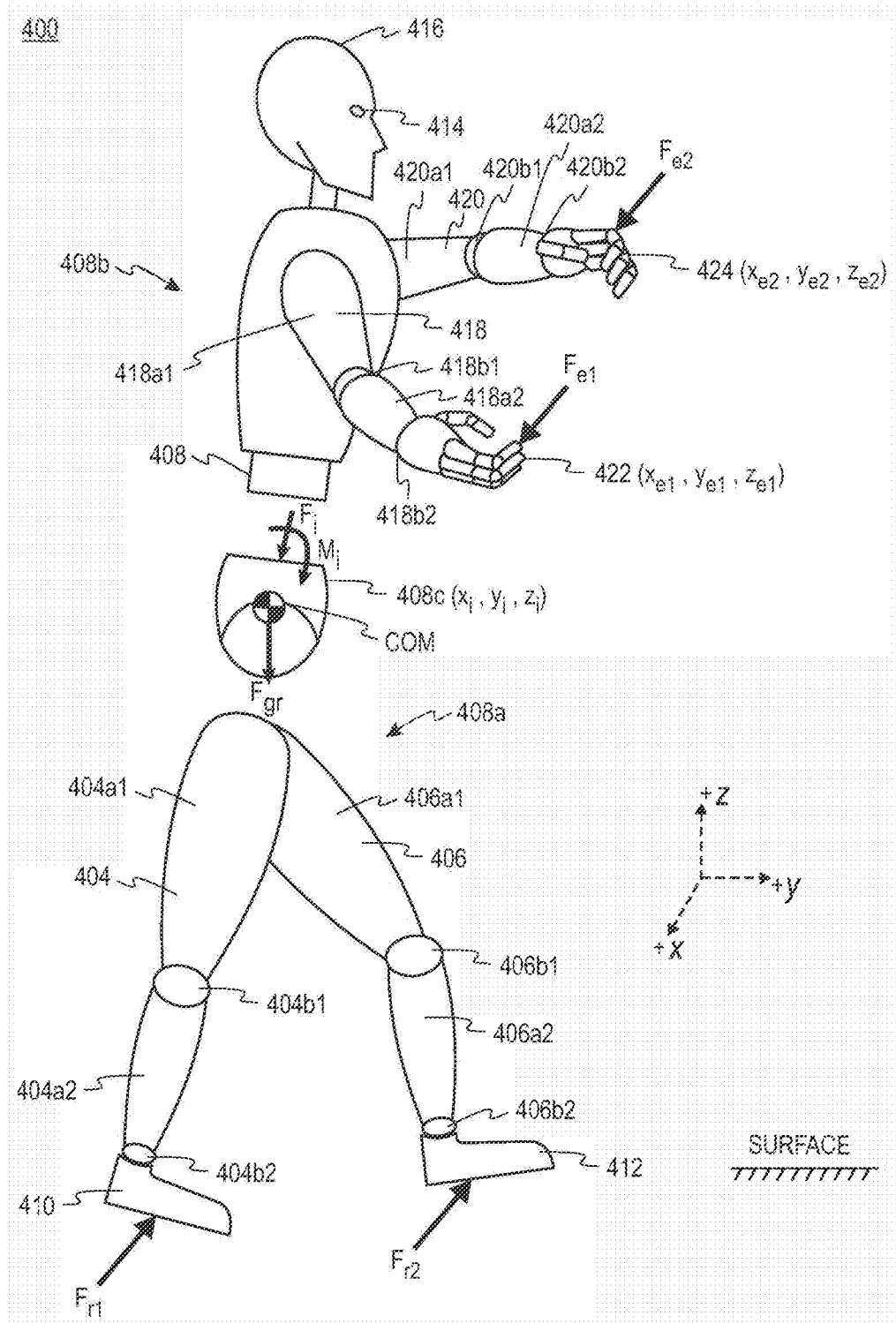
FIG. 4D illustrates an exploded view of the biped robot of FIG. 4A.

The end-effector forces $F_{e1}$, $F_{e2}$ generate a resulting linear force $F_i$ and/or moment $M_i$ on the intermediate body section 408c. FIG. 4D illustrates an exploded view of the robot 400 with the linear force $F_i$ and moment $M_i$ applied to the intermediate body section 408c. Using force and torque sensors, for instance, the upper body control system 417b can determine the linear force $F_i$ and moment $M_i$ and communicate this information to the lower body control system 417a. As such, the lower body control system 417a can operate the legs 404, 406 so that the reaction forces $F_{r1}$, $F_{r2}$ can balance the linear force $F_i$ and/or moment $M_i$ at the intermediate body section 408c.

As shown in FIG. 5, the upper body control system 417b communicates the linear force $F_i$ and the moment $M_i$ to the lower body control system 417a. In addition, the lower body control system 417a controls the intermediate body section 408c according a set $DoF_A$ of one or more degrees of freedom. Meanwhile, the upper body control system 417b controls the intermediate body section 408c according a different set $DoF_B$ of one or more degrees of freedom which do not include those of $DoF_A$.

Furthermore, the lower body control system 417a can dynamically balance the linear force $F_i$ and/or the moment $M_i$ as they change with the operation of the upper body section 408b. The upper body control system 417b enables this dynamic balancing by communicating the changes to the linear force $F_i$ and the moment $M_i$.

Figure 6:
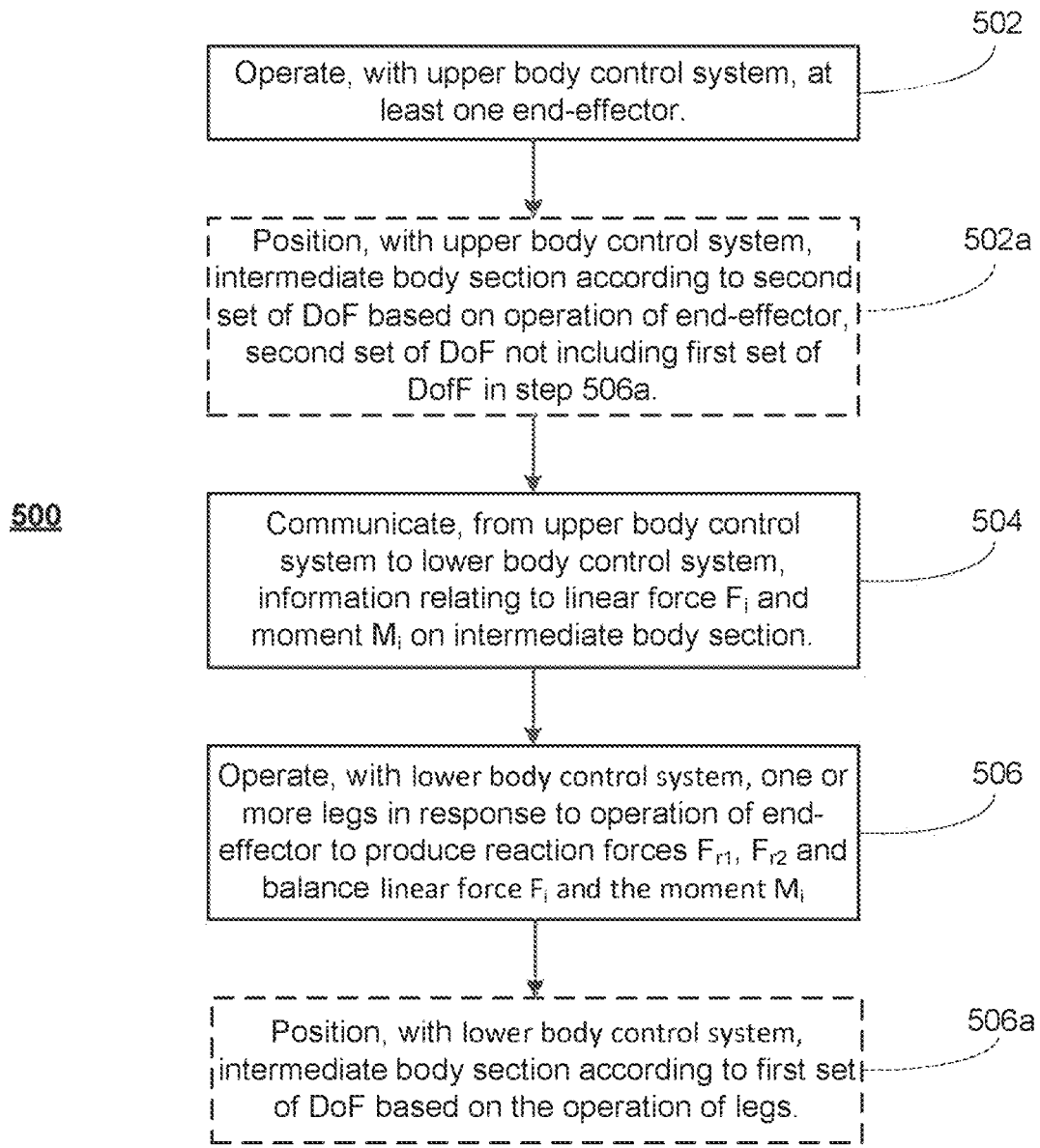
FIG. 6 illustrates a method for operating a robot where dynamic balance is employed for whole body manipulation according to an example implementation.

Accordingly, FIG. 6 illustrates an example process 500 for manipulating the lower body section 408a to support activities performed by the upper body 408b. In step 502, the upper body control system 417b operates at least one of the end-effectors 422, 424. The at least one end-effector 422, 424 experiences an end-effector force $F_{e1}$, $F_{e2}$ based on the operation by the upper body control system 417b. The intermediate body section 408c experiences at least one of a first intermediate body linear force $F_i$ or a first intermediate body moment $M_i$ based on the end-effector force $F_{e1}$, $F_{e2}$. In step 504, the upper body control system 417b communicates, to the lower body control system, information relating to the first intermediate body linear force $F_i$ and the first intermediate body moment $M_i$.

In step 506, the lower body control system 417a operates one or more legs 404, 406 in response to the operation of at least one movable end-effector 422, 424. The one or more legs 404, 406 experience respective reaction forces $F_{r1}$, $F_{r2}$ from the surface based on the operation by the lower body control system 417a. The intermediate body section 408c experiences at least one of a second intermediate body linear force or a second intermediate body moment based on the reaction forces $F_{r1}$, $F_{r2}$. Operation of the one or more legs 404, 406 by the lower body control system 417a determines the second intermediate body linear force and/or the second intermediate body moment. The second intermediate body linear force counteracts the first intermediate linear force $F_i$ on the intermediate body section 408c resulting from the end-effector forces $F_{e1}$, $F_{e2}$. The second intermediate body moment counteracts the first intermediate body moment $M_i$ on the intermediate body section 408c resulting from the end-effector forces $F_{e1}$, $F_{e2}$.

The process 500 may also include step 506a where the lower body control system 417a positions the intermediate body section 408c according to a first set of degrees of freedom based on the operation of the one or more legs 404, 406. Correspondingly, the process 500 may additionally include step 502a where the the upper body control system 417b positions the intermediate body section 408c in response to the operation of the at least one movable end-effector 422, 424. This positioning of the intermediate body section 408c by the upper body control system 417b involves movement according to a second set of degrees of freedom. The upper body control system 417b is constrained from positioning the intermediate body section according to the first set of degrees of freedom.

Although the upper body control system 417b may communicate directly with the lower body control system 417a, the master controller 417c may also help coordinate the interaction between the lower body control system 417a and the upper body control system 417b. For instance, the upper body control system 417b may plan to move one of the end-effectors 422, 424 to a desired position. The master controller 417c can determine whether balance can be maintained by the current position of the feet 410, 412 if the upper body control system 417b attempts to move the end-effector 422, 424 to the desired position. If balance cannot be maintained, the master controller 417c can signal the lower body control system 417a to move the feet 410, 412 to new positions that allow the end-effector 422, 424 to be positioned more stably at the target positions. Alternatively, the lower body control system 417a may determine whether the robot 400 should be moved to the new position.

In addition to controlling the members and joints of the legs 404, 406 to achieve balance with the feet 410, 412 in given positions, the lower body control system 417a may also reposition the feet 410, 412 on the surface to change the reaction forces $F_{r1}$ and $F_{r2}$. Repositioning the feet 410, 412 can also change the moments that the gravitational force $F_{gr}$ produces at the feet 410, 412. The resulting reaction forces $F_{r1}$ and $F_{r2}$ may produce more effective balance for the robot 400.

As described above, the upper body control system 417b can control the upper body section 408b by representing and processing the lower body section 408a as a virtual link connected via the intermediate body section 408c. Advantageously, the virtual link allows positioning and movement (velocity) of the end-effectors 422, 424 to be compensated for motions of the lower body section 408a (also known as station keeping). For instance, if the upper body control system 417b commands an end-effector 422, 424 to move at some velocity relative to some stationary object in the world, such movement should account for motions of the lower body section 408a even though the the upper body control system 417b does not have direct control of the lower body section 408a (which is primarily dealing with balance and locomotion). In this case, the lower body control system 417a can estimate the virtual link velocity and pass the velocity to the upper body control system 417b, which can then adjust the the inverse kinematics solver 419b accordingly. The inverse kinematics solver 419b may use the velocity of the virtual link to determine a motion plan for the upper body section 408b that achieves desired velocities for the end-effectors 422, 424 in a static world frame.

Although the examples described herein may achieve dynamic balancing in response to end-effector forces that are detected by force/torque sensors, dynamic balancing may also be achieved in other implementations based on calculations of expected or desired end-effector forces. In such implementations, the lower body control system 417a advantageously compensates for the expected or desired end-effector forces preemptively before any balance or positioning errors occur.

Furthermore, although the examples described herein may achieve dynamic balancing in response to loads supported by the end-effectors, dynamic balancing can also be achieved in other implementations when other loads are additionally or alternatively experienced by the upper body section. For instance, upper body section may experience dynamic forces, such as forces required to accelerate an arm, an end-effector, or a payload, during high-speed motions. Such dynamic forces also generate a resulting linear force and/or moment on the intermediate body section, which the lower body control can also balance with the reaction forces.

C. Balancing the Lower Body to Support Operation of End-Effectors During Movement by the Robot The lower body control system 417a can additionally control the reaction forces $F_{r1}$ and $F_{r2}$ to move the robot 400 according to a desired gait. For instance, rather than solely controlling the leg 404 to balance the robot 400 as shown in FIG. 4B, the lower body control system 417a can also operate the leg 406 to plant the foot 412 on the surface. The resulting reaction force $F_{r2}$ can produce an opposing moment $M_{r2}$ to balance the moment $M_{gr}$ produced by the gravitational force $F_{gr}$. As such, planting the foot 412 on the surface to balance the moment $M_{gr}$ may constitute a step in a gait.

Once the foot 412 is planted and the robot 400 is balanced, the lower body control system 417a can operate the legs 404, 406 to reposition the center of mass and produce another moment $M_{gr}$ with the gravitational force $F_{gr}$. The moment $M_{gr}$ causes the body 408 to fall forward, but the lower body control system 417a can operate the leg 404 to swing the foot 410 forward and plant the foot 410 on the surface. The resulting reaction force $F_{r1}$ on the foot 410 produces another opposing moment $M_{r1}$ that balances the moment $M_{gr}$. As such, planting the foot 410 on the surface constitutes a second step. Alternately repeating the steps by the feet 410, 412 results in a gait. As described, the lower body control system 417a can establish a state of balance with each alternating step, before causing the body 408 to fall forward again for the next step.

The reaction forces $F_{r1}$ and $F_{r2}$ are not limited to balancing the effect of the gravitational force $F_{gr}$. When each foot 410, 412 contacts the surface, the lower body control system 417a may operate the respective leg 404, 406 to apply additional forces to the surface. For instance, the legs 410, 412 may apply forces in the negative y-direction. In response to this force, a y-component of the respective reaction force $F_{r1}$. $F_{r2}$ acts on the feet 410, 412 in the positive y-direction. This y-component results from the friction between the feet 410, 412 and the surface. Accordingly, the ground reaction forces $F_{r1}$, $F_{r2}$ apply forces which can help push the body 408 forward in the positive-y direction. Thus, the application of forces in the negative y-direction may constitute pushes off the surface to achieve a faster gait.

Additionally or alternatively, the legs 410, 412 may apply forces to the surface in the positive or negative x-direction. In response to this force, a x-component of the respective ground reaction force $F_{r1}$, $F_{r2}$ acts on the feet 410, 412 in the opposing x-direction. This x-component results from the friction between the feet 410, 412 and the surface. Accordingly, the reaction forces $F_{r1}$, $F_{r2}$ apply forces which can help push the body 408 laterally in the positive and/or negative x-direction.

The lower body control system 417a can dynamically balance the body 408 to allow the end-effectors 422, 424 to be positioned and operated while the robot 400 is moving according to a gait. Indeed, the robot 400 can walk or run along a ground surface, and due to the dynamic balancing, the robot 400 can simultaneously operate the arm 418 to position the end-effector 422, e.g., to grab an object, without interrupting the gait. To produce a balance for desired operation of the end-effectors 422, 422 at a given time during the gait, the lower body control system 417a can account for the additional forces applied/experienced by the legs 404, 406 as the robot 400 moves according to the gait. To achieve the desired reaction forces $F_{r1}$. $F_{r2}$ for balancing and moving the body 408, the lower body control system 417a may employ inverse kinematics to determine corresponding velocities for positioning and orienting the members and joints of the legs 404, 406. Furthermore, the lower body control system 417a can dynamically adjust the positioning/repositioning of the feet 410, 412 to maintain the gait during the balancing process described above.

IV. Conclusion

In view of the foregoing, a robot can operate its legs to dynamically balance itself on a surface while operating its end-effectors. When the legs contact a surface (e.g., ground surface), the legs apply forces to the surface and experience reaction forces from the surface. The robot can dynamically control the legs so that the reaction forces allow the robot to maintain a balance that supports the operation of the end-effectors.

Although example implementations may include a biped robot, other configurations may include a lower body that provides dynamic balancing while an upper body performs tasks with one or more end-effectors. In addition, although the examples above may describe balancing the forces $F_{e1}$, $F_{e2}$ and moments $M_{e1}$, $M_{e2}$ associated with the end-effectors 422, 424, it is understood that a robot may experience forces and moments from loads at other components of the robot. For instance, robot may include a receptacle for carrying cargo. The robot can achieve dynamic balancing by similarly accounting for these other loads.

The above detailed description describes various features and functions of the disclosed systems, devices, and methods with reference to the accompanying figures. In the figures, similar symbols typically identify similar components, unless context indicates otherwise. The illustrative implementations described in the detailed description, figures, and claims are not meant to be limiting. Other implementations can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example implementations. Alternative implementations are included within the scope of these example implementations. In these alternative implementations, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

A computer-readable medium may include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

What is claimed is:

1. A robot system comprising:
a movable end-effector;
a leg;
a body; and
a control system configured to:
operate the movable end-effector, the movable end-effector experiencing a first force based on operation of the movable end-effector, and the body experiencing a second force based on the first force experienced by the movable end-effector, wherein the first force experienced by the movable end-effector is different from the second force experienced by the body;
determine a third force to balance to the second force experienced by the body; and
operate the leg to balance the body based on determining the third force to balance to the second force experienced by the body.

2. The robot system of claim 1, wherein the control system is further configured to balance the third force to the second force experienced by the body to balance the body.

3. The robot system of claim 1, wherein the third force directionally opposes the second force experienced by the body.

4. The robot system of claim 1, wherein the control system comprises a first control system configured to operate the movable end-effector and a second control system configured to operate the leg.

5. The robot system of claim 1, wherein the leg experiences the third force based on operation of the leg, and the body experiences a fourth force based on the third force experienced by the leg.

6. The robot system of claim 1, wherein the leg experiences a fourth force based on operation of the leg, and the body experiences the third force based on the fourth force experienced by the leg.

7. The robot system of claim 1, wherein the leg is configured to contact a surface.

8. The robot system of claim 1, wherein the body links the movable end-effector with the leg.

9. The robot system of claim 1, wherein the control system is further configured to receive information associated with the second force experienced by the body.

10. The robot system of claim 1, wherein the control system is further configured to:
position the body according to one or more first degrees of freedom based on operation of the leg; and
position the body according to one or more second degrees of freedom based on the operation of the movable end-effector.

11. The robot system of claim 1, wherein the control system is further configured to:
position the body according to one or more first degrees of freedom based on operation of the leg; and
position the body according to one or more second degrees of freedom based on the operation of the movable end-effector, wherein the control system is constrained from positioning the body according to the one or more first degrees of freedom based on the operation of the movable end-effector.

12. The robot system of claim 1, wherein the control system is further configured to:
position the body according to one or more first degrees of freedom based on operation of the leg, wherein positioning the body according to the one or more first degrees of freedom causes translation of the body along a first axis and a second axis; and
position the body according to one or more second degrees of freedom based on the operation of the movable end-effector, wherein positioning the body according to the one or more second degrees of freedom causes rotation of the body about at least three axes and causes translation of the body along a third axis.

13. The robot system of claim 1, wherein the robot system further comprises at least two legs, each leg of the at least two legs associated with a respective foot configured to contact a surface.

14. The robot system of claim 1, wherein the robot system further comprises at least two legs and at least two feet, each leg of the at least two legs associated with a respective foot of the at least two feet configured to contact a surface, wherein the control system is further configured to:
for a given position of each foot of the at least two feet, determine whether the control system can balance a respective third force to the second force experienced by the body; and
in response to determining that the control system cannot balance the respective third force to the second force experienced by the body, reposition at least one of the at least two feet on the surface.

15. The robot system of claim 1, wherein the robot system further comprises at least two legs and at least two feet, each leg of the at least two legs associated with a respective foot of the at least two feet configured to contact a surface, wherein the control system is further configured to:
for a given position of each foot of the at least two feet, determine whether the control system can balance a respective third force to the second force experienced by the body, wherein operation of the leg is in response to determining that the control system can balance the third force to the second force experienced by the body.

16. The robot system of claim 1, wherein the robot system further comprises at least two legs and at least two feet, each leg of the at least two legs associated with a respective foot of the at least two feet configured to contact a surface, wherein the control system is further configured to:
for a given position of each foot of the at least two feet, determine whether the control system can balance a respective third force to the second force experienced by the body;
in response to determining that the control system cannot balance the respective third force to the second force experienced by the body, reposition at least one of the at least two feet on the surface; and
reposition the at least one of the at least two feet according to a gait.

17. A computer-implemented method comprising:
operating, by data processing hardware, a movable end-effector of a robot system, the movable end-effector experiencing a first force based on operation of the movable end-effector, and a body of the robot system experiencing a second force based on the first force experienced by the movable end-effector, wherein the first force experienced by the movable end-effector is different from the second force experienced by the body;

determining, by the data processing hardware, a third force to balance to the second force experienced by the body; and operating, by the data processing hardware, a leg of the robot system to balance the body based on determining the third force to balance to the second force experienced by the body.

18. The computer-implemented method of claim 17, further comprising:

positioning, by the data processing hardware, the body according to one or more first degrees of freedom based on operation of the leg; and positioning, by the data processing hardware, the body according to one or more second degrees of freedom based on the operation of the movable end-effector.

19. The computer-implemented method of claim 17, wherein the operating the leg includes balancing the third force to the second force experienced by the body to balance the body.

20. The computer-implemented method of claim 17, wherein the robot system further comprises at least two legs and at least two feet, each leg of the at least two legs associated with a respective foot of the at least two feet, the method further comprising:

for a given position of each foot of the at least two feet, determine whether a respective third force can balance to the second force experienced by the body; and in response to determining that the respective third force cannot balance to the second force experienced by the body, reposition at least one of the at least two feet on a surface according to a gait.

\* \* \* \* \*